US008290902B1

(12) United States Patent
Shaver et al.

(10) Patent No.: US 8,290,902 B1
(45) Date of Patent: *Oct. 16, 2012

(54) SHARED EDIT ACCESS OF ELECTRONIC CONTENT

(75) Inventors: Robert Shaver, Watertown, MA (US); Paul Kleppner, Lexington, MA (US)

(73) Assignee: Adobe Systems Incorporated, San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/081,236

(22) Filed: Apr. 6, 2011

Related U.S. Application Data

(63) Continuation of application No. 12/119,335, filed on May 12, 2008, now Pat. No. 7,949,633.

(51) Int. Cl.
  *G06F 7/00* (2006.01)
  *G06F 17/00* (2006.01)

(52) U.S. Cl. ........................................ 707/620

(58) Field of Classification Search .................. None
See application file for complete search history.

(56) References Cited

U.S. PATENT DOCUMENTS

| | | | |
|---|---|---|---|
| 4,714,992 A | 12/1987 | Gladney et al. |
| 4,949,300 A | 8/1990 | Christenson et al. |
| 5,008,853 A | 4/1991 | Bly et al. |
| 5,014,267 A | 5/1991 | Tompkins et al. |
| 5,072,412 A | 12/1991 | Henderson, Jr. et al. |
| 5,220,657 A | 6/1993 | Bly et al. |
| 5,245,553 A | 9/1993 | Tanenbaum |
| 5,247,615 A | 9/1993 | Mori et al. |
| 5,293,619 A | 3/1994 | Dean |
| 5,339,389 A | 8/1994 | Bates et al. |
| 5,379,374 A | 1/1995 | Ishizaki et al. |
| 5,388,196 A | 2/1995 | Pajak et al. |
| 5,428,729 A | 6/1995 | Chang et al. |
| 5,446,842 A | 8/1995 | Schaeffer et al. |
| 5,471,318 A | 11/1995 | Ahuja et al. |
| 5,515,491 A | 5/1996 | Bates et al. |
| 5,608,872 A | 3/1997 | Schwartz et al. |
| 5,617,539 A | 4/1997 | Ludwig et al. |
| 5,664,183 A | 9/1997 | Cirulli et al. |
| 5,671,428 A | 9/1997 | Muranaga et al. |
| 5,732,184 A | 3/1998 | Chao et al. |
| 5,758,079 A | 5/1998 | Ludwig et al. |
| 5,764,902 A | 6/1998 | Rothrock |
| 5,778,368 A | 7/1998 | Hogan et al. |
| 5,787,175 A | 7/1998 | Carter |
| 5,835,601 A | 11/1998 | Shimbo et al. |
| 5,867,654 A | 2/1999 | Ludwig et al. |

(Continued)

OTHER PUBLICATIONS

Agarwal et al "Supporting collaborative computing and interaction", Lawrence Berkeley National Laboratory, May 2002, 6 pages.*

(Continued)

*Primary Examiner* — Uyen T. Le

(74) *Attorney, Agent, or Firm* — Schwegman Lundberg Woessner P.A.

(57) ABSTRACT

In various embodiments, a computerized method includes presenting an electronic document to one user out of multiple users that have edit access to the electronic document as part of a collaborative editing of the electronic document. The computerized method may include receiving an input from the user to edit the electronic document, as well as invoking a lock to prevent edit access by the other users responsive to receiving the input from the user to edit the electronic document.

21 Claims, 8 Drawing Sheets

U.S. PATENT DOCUMENTS

| | | | |
|---|---|---|---|
| 5,907,324 | A | 5/1999 | Larson et al. |
| 5,920,694 | A | 7/1999 | Carleton et al. |
| 5,963,208 | A | 10/1999 | Dolan et al. |
| 5,966,512 | A | 10/1999 | Bates et al. |
| 5,978,817 | A | 11/1999 | Giannandrea et al. |
| 5,995,097 | A | 11/1999 | Tokumine et al. |
| 6,005,568 | A | 12/1999 | Simonoff et al. |
| 6,005,571 | A | 12/1999 | Pachauri |
| 6,088,702 | A | 7/2000 | Plantz et al. |
| 6,243,722 | B1 | 6/2001 | Day |
| 6,266,683 | B1 | 7/2001 | Yehuda et al. |
| 6,314,408 | B1 | 11/2001 | Salas et al. |
| 6,314,425 | B1 | 11/2001 | Serbinis et al. |
| 6,342,906 | B1 | 1/2002 | Kumar et al. |
| 6,366,933 | B1 | 4/2002 | Ball et al. |
| 6,442,748 | B1 | 8/2002 | Bowman-Amuah et al. |
| 6,446,093 | B2 | 9/2002 | Tabuchi |
| 6,502,113 | B1 | 12/2002 | Crawford et al. |
| 6,507,845 | B1 | 1/2003 | Cohen et al. |
| 6,584,466 | B1 | 6/2003 | Serbinis et al. |
| 6,632,251 | B1 | 10/2003 | Rutten et al. |
| 6,643,663 | B1 | 11/2003 | Dabney et al. |
| 6,701,345 | B1 | 3/2004 | Carley et al. |
| 6,721,921 | B1 | 4/2004 | Altman |
| 6,757,871 | B1 | 6/2004 | Sato et al. |
| 6,772,393 | B1 | 8/2004 | Estrada et al. |
| 6,816,906 | B1 | 11/2004 | Icken et al. |
| 6,819,806 | B1 | 11/2004 | Kubota et al. |
| 6,839,878 | B1 | 1/2005 | Icken et al. |
| 6,865,548 | B2 | 3/2005 | Wiechers |
| 6,865,713 | B1 | 3/2005 | Bates et al. |
| 6,874,124 | B2 | 3/2005 | Murase et al. |
| 6,889,896 | B2 | 5/2005 | Silverbrook et al. |
| 6,894,804 | B2 | 5/2005 | Nguyen et al. |
| 6,898,601 | B2 | 5/2005 | Amado et al. |
| 6,901,376 | B1 | 5/2005 | Sculler et al. |
| 6,918,082 | B1 | 7/2005 | Gross et al. |
| 6,934,721 | B2 | 8/2005 | Schein |
| 6,950,828 | B2 | 9/2005 | Shaw et al. |
| 6,991,154 | B2 | 1/2006 | Silverbrook et al. |
| 7,007,232 | B1 | 2/2006 | Ross et al. |
| 7,028,267 | B1 | 4/2006 | Beezer et al. |
| 7,044,363 | B2 | 5/2006 | Silverbrook et al. |
| 7,051,031 | B2 | 5/2006 | Schein |
| 7,062,532 | B1 * | 6/2006 | Sweat et al. .......... 709/205 |
| 7,146,367 | B2 | 12/2006 | Shutt |
| 7,249,314 | B2 | 7/2007 | Walker et al. |
| 7,263,655 | B1 | 8/2007 | Carden, Jr. |
| 7,325,186 | B2 | 1/2008 | Jones et al. |
| 7,392,469 | B1 | 6/2008 | Bailin |
| 7,506,262 | B2 | 3/2009 | Gupta et al. |
| 7,574,669 | B1 | 8/2009 | Braun et al. |
| 7,587,407 | B2 | 9/2009 | Gruhl et al. |
| 7,676,759 | B2 | 3/2010 | Carter |
| 7,724,249 | B1 | 5/2010 | Horikawa et al. |
| 7,769,810 | B1 | 8/2010 | Kaufman |
| 7,904,425 | B2 | 3/2011 | Cannon et al. |
| 7,945,595 | B1 | 5/2011 | Kraley |
| 7,949,633 | B1 | 5/2011 | Shaver et al. |
| 7,950,064 | B2 | 5/2011 | Chavez et al. |
| 2001/0043716 | A1 | 11/2001 | Price et al. |
| 2002/0133628 | A1 | 9/2002 | Asplund et al. |
| 2002/0163548 | A1 | 11/2002 | Chiu et al. |
| 2002/0186252 | A1 | 12/2002 | Himmel et al. |
| 2003/0214528 | A1 | 11/2003 | Pierce et al. |
| 2004/0041843 | A1 | 3/2004 | Cui et al. |
| 2004/0088331 | A1 | 5/2004 | Therrien et al. |
| 2004/0172595 | A1 | 9/2004 | Lerner et al. |
| 2005/0064858 | A1 | 3/2005 | Makela et al. |
| 2005/0081159 | A1 | 4/2005 | Gupta et al. |
| 2005/0193325 | A1 | 9/2005 | Epstein |
| 2005/0262225 | A1 * | 11/2005 | Halpern et al. .......... 709/220 |
| 2006/0010382 | A1 | 1/2006 | Ejiri et al. |
| 2006/0026502 | A1 | 2/2006 | Dutta |
| 2006/0161578 | A1 | 7/2006 | Siegel et al. |
| 2006/0184901 | A1 | 8/2006 | Dietz |
| 2007/0118794 | A1 | 5/2007 | Hollander et al. |
| 2007/0198616 | A1 | 8/2007 | Goto |
| 2007/0239831 | A1 | 10/2007 | Basu |
| 2007/0260996 | A1 | 11/2007 | Jakobson |
| 2007/0271248 | A1 | 11/2007 | Albernoz et al. |
| 2007/0271502 | A1 | 11/2007 | Bedi et al. |
| 2008/0016091 | A1 | 1/2008 | Chandra |
| 2008/0059539 | A1 | 3/2008 | Chin et al. |
| 2008/0072135 | A1 | 3/2008 | Cragun et al. |
| 2008/0103877 | A1 | 5/2008 | Gerken |
| 2008/0209361 | A1 | 8/2008 | Nickerson et al. |
| 2008/0250329 | A1 | 10/2008 | Stefik et al. |
| 2008/0250332 | A1 | 10/2008 | Farrell et al. |
| 2009/0097815 | A1 | 4/2009 | Lahr et al. |
| 2009/0157811 | A1 | 6/2009 | Bailor et al. |
| 2009/0235155 | A1 | 9/2009 | Ueda |
| 2010/0145947 | A1 | 6/2010 | Kolman et al. |

OTHER PUBLICATIONS

Agarwal et al "Supporting Collaborative Computing and Interaction", Lawrence Berkeley National Laboratory 2002, 5 pages.*

"Adobe to Acquire Virtual Ubiquity", The Buzzword Blog, Building the first real word processor for the web, [Online] Retrieved from the internet: <URL:http://blog.buzzword.com/vu/index.php?paged=2>, (Oct. 1, 2007), 10 pgs.

"U.S. Appl. No. 12/119,249, Non-Final Office Action mailed Dec. 23, 2010", 11 pgs.

"U.S. Appl. No. 12/119,249, Response filed Mar. 23, 2011 to Non-Final Office Action mailed Dec. 23, 2010", 10 pgs.

"U.S. Appl. No. 12/119,335, Non-Final Office Action mailed Sep. 1, 2010", 8 pgs.

"U.S. Appl. No. 12/119,335, Notice of Allowance mailed Jan. 13, 2011", 4 pgs.

"U.S. Appl. No. 12/119,335, Response filed Dec. 1, 2010 to Non-Final Office Action mailed Sep. 1, 2010", 12 pgs.

"U.S. Appl. No. 12/119,350, Advisory Action mailed Aug. 4, 2010", 3 pgs.

"U.S. Appl. No. 12/119,350, Final Office Action mailed May 12, 2010", 14 pgs.

"U.S. Appl. No. 12/119,350, Non-Final Office Action mailed Oct. 16, 2009", 11 pgs.

"U.S. Appl. No. 12/119,350, Pre-Appeal Brief Request filed Aug. 12, 2010", 5 pgs.

"U.S. Appl. No. 12/119,350, Response filed Jan. 19, 2010 to Non-Final Office Action mailed Oct. 16, 2009", 11 pgs.

"U.S. Appl. No. 12/119,350, Response filed Jul. 12, 2010 to Final Office Action mailed May 12, 2010", 10 pgs.

"U.S. Appl. No. 12/119,407, Non-Final Office Action mailed Sep. 9, 2010", 12 pgs.

"U.S. Appl. No. 12/119,407, Notice of Allowance mailed Feb. 18, 2011", 7 pgs.

"U.S. Appl. No. 12/119,407, Response filed Dec. 9, 2010 to Non-Final Office Action mailed Sep. 9, 2010", 17 pgs.

"U.S. Appl. No. 12/119,421, Advisory Action mailed Mar. 22, 2011", 3.

"U.S. Appl. No. 12/119,421, Final Office Action mailed Jan. 13, 2011", 27 pgs.

"U.S. Appl. No. 12/119,421, Non-Final Office Action mailed Sep. 14, 2010", 22 pgs.

"U.S. Appl. No. 12/119,421, Response filed Mar. 3, 2011 to Final Office Action mailed Jan. 13, 2011", 13 pgs.

"U.S. Appl. No. 12/119,421, Response filed Nov. 23, 2010 to Non-Final Office Action mailed Sep. 14, 2010", 14 pgs.

"U.S. Appl. No. 12/119,425, Non-Final Office Action mailed Mar. 1, 2011", 17 pgs.

"Comparison of office suites", Comparison of office suites—Wikipedia, the free encyclopedia, [Online] Retrieved from the internet: <URL:http://en.wikipedia.org/wiki/List_of_office_suites>, (Mar. 16, 2008), 4 pgs.

"Forthcoming Functionality", The Buzzword Blog, Building the first real word processor for the web, [Online] Retrieved from the internet: <URL:http://blog.buzzword.com/vu/index.php?paged=3>, (Jul. 15, 2007), 10 pgs.

"Google Docs", Google Docs—Wikipedia, the free encyclopedia, [Online]. Retrieved from the internet: <URL:http://en.wikipedia.org/wiki/Google_Docs>, (Mar. 16, 2008), 3 pages.

"List of word processors", From Wikipedia, the free encyclopedia, The following is a list of word processors, [Online] Retrieved from the internet: <URL:http://en.wikipedia.org/wiki/List_of_word_processors>, (Mar. 16, 2008), 4 pgs.

"The Buzzword Blog Building the first real word processor for the web", Buzzword vs Google docs, [Online] Retrieved from the internet: <URL:http://blog.virtub.com/>, (Mar. 12, 2008), 13 pages.

"ThinkFree Docs :: Search, Share & Publish documents Page", [Online] Retrieved from the internet: <URL:http://www.thinkfreedocs.com/, (Mar. 16, 2008), 1 page.

"ThinkFree Docs::Search, Share & Publish documents", [Online]. Retrieved from the internet: <URL:http://wwvv.thinkfreedocs.com/about/faq.html>, FAQ, (Mar. 16, 2008), 1 page.

"ThinkFree Office by Haansoft Corporation", From Wikipedia, the free encyclopedia (Redirected from ThinkFree), [Online] Retrieved from the internet: <URL:http://en.wikipedia.org/wiki/ThinkFree>, (Nov. 7, 2006), 3 pgs.

"Working with Collaborators: Real time collaboration", [Online]. Retrieved from the internet: <URL:http://documents.google.com/support/bin/answer.py?answer=40971&topic=8628>, Google Docs Help Center, (Mar. 16, 2008), 2 pages.

"Working with Collaborators: Simultaneous editing and viewing", [Online]. Retrieved from the internet: <URL:http://documents.google.com/support/bin/answer.py?answer=44680&topic=8628>, Google Docs Help Center, (Mar. 16, 2008), 2 pages.

"ZCubes", From Wikipedia, the free encyclopedia, [Online] Retrieved from the internet: <URL:http://en.wikipedia.org/wiki/ZCubes>, (Sep. 30, 2007), 5 pages.

"Zoho Office Suite", From Wikipedia, the free encyclopedia (Redirected from Zoho Writer) Developed by AdventNet Inc. <URL:http://www.zoho.com>, [Online] Retrieved from the interent: <URL:http://en.wikipedia.org/wiki/Zoho_Writer>, (Mar. 16, 2008), 5 pgs.

Descy, Don E, "Browser-Based Online Applications: Something for Everyone!", TechTrends: Linking Research and Practice to Improve Learning, 51(2), (Mar. 2007), 3-5.

Shen, H., "Integrating Advanced Collaborative Capabilities into Web-Based Word Processors", Lecture Notes in Computer Science, 4674, (2007), 1-8.

Simsarian, Kristian, et al., "Shared Spatial Desktop Development", Kungl Tekniska Hogskolan Royal Institute of Technology Numerical Analysis and Computing Science. CID-86, KTH, Stockholm, Sweden 1999, Report No. CID-86, ISSN No. ISSN 1403-073X Reports can be ordered from: URL: http://www.nada.kth.se/cid/, (Aug. 1999), 103 pgs.

"U.S. Appl. No. 12/119,249, Final Office Action mailed Jun. 9, 2011", 15 pgs.

"U.S. Appl. No. 12/119,397, Non-Final Office Action mailed Jun. 23, 2011", 20 pgs.

"U.S. Appl. No. 12/119,397, Response filed Aug. 10, 2011 to Non-Final Office Action mailed Jun. 23, 2011", 9 pgs.

"U.S. Appl. No. 12/119,421, Response filed May 12, 2011 to Advisory Action mailed Mar. 22, 2011", 15 pgs.

"U.S. Appl. No. 12/119,425, Final Office Action mailed Aug. 19, 2011", 18 pgs.

"U.S. Appl. No. 12/119,425, Response filed Jun. 1, 2011 to Non-Final Office Action mailed Mar. 1, 2011", 17 pgs.

U.S. Appl. No. 12/119,249, Examiner Interview Summary mailed Oct. 5, 2010, 3 pgs.

U.S. Appl. No. 12/119,249, Response filed Oct. 10, 2011 to Final Office Action mailed Jun. 9, 2011, 9 pgs.

U.S. Appl. No. 12/119,350, Appeal Brief filed Oct. 28, 2010, 25 pgs.

U.S. Appl. No. 12/119,350, Decision on Pre-Appeal Brief Request mailed Sep. 28, 2010, 2 pgs.

U.S. Appl. No. 12/119,350, Examiner's Answer to Appeal Brief mailed Nov. 29, 2010, 15 pgs.

U.S. Appl. No. 12/119,397, Final Office Action mailed Oct. 28, 2011, 18 pgs.

U.S. Appl. No. 12/119,407, 312 Amendment filed Apr. 11, 2011, 3 pgs.

U.S. Appl. No. 12/119,407, PTO Response to 312 Amendment mailed Apr. 15, 2011, 2 pgs.

U.S. Appl. No. 12/119,421, Final Office Action mailed Feb. 29, 2012, 31 pgs.

U.S. Appl. No. 12/119,421, Non Final Office Action mailed Oct. 18, 2011, 29 pgs.

U.S. Appl. No. 12/119,421, Response filed Jan. 18, 2012 to Non Final Office Action mailed Oct. 18, 2011, 15 pgs.

U.S. Appl. No. 12/119,421. Examiner Interview Summary mailed Jan. 31, 2012, 3 pgs.

U.S. Appl. No. 12/119,425, Appeal Brief filed Mar. 22, 2012, 16 pgs.

* cited by examiner

US 8,290,902 B1

SHARED EDIT ACCESS OF ELECTRONIC CONTENT

CLAIM OF PRIORITY

This application is a continuation of U.S. application Ser. No. 12/119,335, filed May 12, 2008, which application is incorporated in its entirety herein by reference.

COPYRIGHT

A portion of the disclosure of this document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software, data, and/or screenshots which may be described below and in the drawings that form a part of this document: Copyright 2008, Adobe® Systems Incorporated. All Rights Reserved.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In a collaborative content creation and review environment, content (e.g., an electronic document) may be stored in a server for access (e.g., edit, read, review, etc.) by multiple users using different client devices. In particular, the server may be communicatively coupled to the client devices to enable access by the users. In such an application, users may edit a same electronic content at substantially the same time, or at different times.

BRIEF DESCRIPTION OF THE DRAWINGS

The embodiments are provided by way of example and not limitation in the figures of the accompanying drawings, in which like references indicate similar elements and in which.

DETAILED DESCRIPTION

Methods, apparatus and systems for shared edit access of content in a collaborative environment are described. In the following description, numerous specific details are set forth. However, it is understood that embodiments of the invention may be practiced without these specific details. In other instances, structures and techniques have not been shown in detail in order not to obscure the understanding of this description.

As used herein, the term "content" or "electronic content" may comprise any type of content for use in electronic form. Examples of content may comprise Portable Document Format ("PDF") which may be viewed and modified in one of the Adobe® Acrobat® programs, a web page, a word processing document (such as a Microsoft® Word document), a spread sheet document, page-descriptive electronic content, hypertext document, a markup language document, declarative specification document (such as for example a HyperText Markup Language HTML or eXtensible Markup Language (XML) document), a fillable form or data describing application graphical user interface, etc.

Some example embodiments are performed in a collaborative environment, wherein multiple users may access (e.g., edit, read, review, etc.) content. In particular, the content may be stored in a server. The users may access the content over a network using different client devices. Example embodiments enable shared edit access of content in such an environment. In particular, multiple users may edit the content.

In some example embodiments, a user locks the content to prevent other users from editing the content after the user performs content editing. In some example embodiments, the lock to prevent edit access remains until the edited content is saved. The saving of the content may be invoked by the user that performed the editing activity. Alternatively or in addition, the saving of the content may be invoked by the application (used to edit the content) after a given time period has expired since the edit has occurred. After the edited content has been saved, any of the users having edit access may edit the content. Once another edit has been performed by any one of the users, the content is again locked. The user that edited the content now has control and precludes other users from editing the content until the edits are saved. Accordingly, users are not required to explicitly check-out/check-in the content each time they are going to edit the content. In some example embodiments, the locking of the content for editing is integrated into editing/saving operations. Thus, some example embodiments provide more transparent and easier shared edit access for the multiple users.

Figure 1:
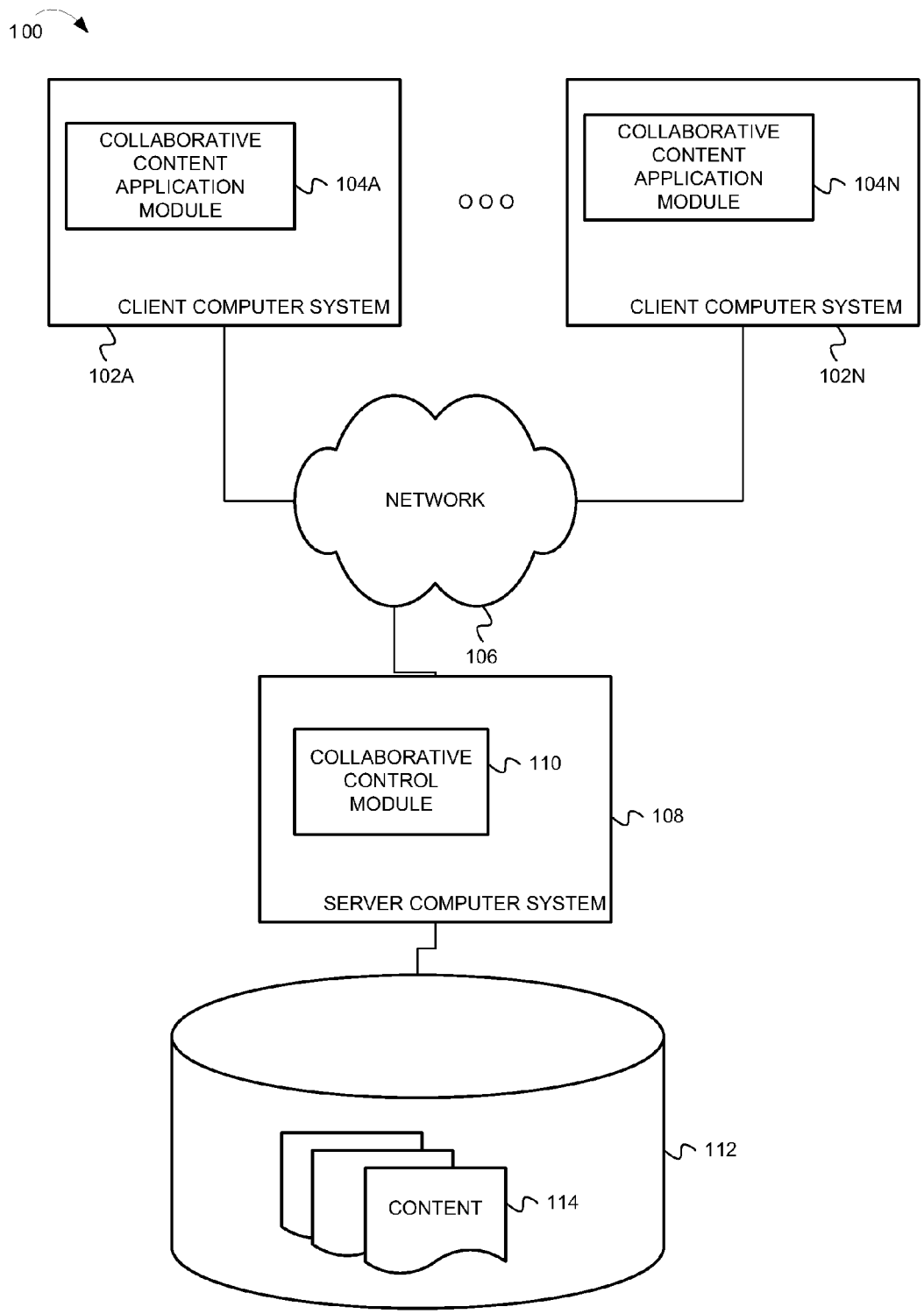
FIG. 1 is a system diagram of a collaborative environment for shared edit access of electronic content, according to some example embodiments.

FIG. 1 is a system diagram of a collaborative environment for shared edit access of electronic content, according to some example embodiments. A system 100 comprises a server computer system 108 and client computer systems 102A-102N that are couple together through a network 106.

The server computer system 108 comprises a collaborative control module 110 (hereinafter "the control module 110") and is coupled to a machine-readable medium 112 (which may be or may not be part of the server computer system 108). In some example embodiments, the machine-readable medium includes tangible volatile and/or non-volatile media (e.g., read only memory (ROM), random access memory (RAM), magnetic disk storage media, optical storage media, flash memory devices, etc.). The machine-readable medium 112 may store content 114 that may be shared by multiple users. In particular, multiple users may access (edit, read, review, etc.) the same content 114. For example more than one user (using one or more client computer systems 102) may edit the same electronic document forming a part of the electronic content 114 that is stored in the machine-readable medium 112.

The client computer systems 102A-102N comprise collaborative content application module 104A-104N (hereinafter "application modules 104"), respectively. The application modules 104 and the control module 110 may be software, hardware, firmware or a combination thereof for executing the various operations described herein, according to some example embodiments.

As part of multiple users having edit access to the same content 114, a first user may edit the content 114 using the application module 104A, and a second user may edit the same content 114 using the application module 104N at a different time. For example, the application modules 104 may comprise a type of word processor application for editing electronic documents. The application modules 104 may retrieve a copy of the content 114 from the server computer system 108 and make edits to such content 114. As further described below, after a first user edits (using the application module 104) a particular portion of the content 114, that portion of the content 114 is locked from being editing by other users until it is saved onto the machine-readable medium 112.

The system 100 may comprise any number of client computer systems 102. While the control module 110 and the content 114 are described as forming part of the same server, many embodiments are not so limited. Alternatively or in addition, the content 114 and the control module 110 may be distributed across any number of network storage devices/ servers.

In some embodiments, operations may be executed in a peer-to-peer architecture. The network communication may occur as part of any combination of wired and wireless communication. In some embodiments, network communication may be based on one or more communication protocols (e.g., HyperText Transfer Protocol (HTTP), HTTP Secured (HTTPS), Real Time Messaging Protocol (RTMP), Real Time Messaging Protocol Secured/SSL (RTMPS), etc.). While the system 100 shown in FIG. 1 employs a client-server architecture, embodiments are not limited to such an architecture, and could equally well find application in a distributed, or peer-to-peer, architecture system.

Figure 2:
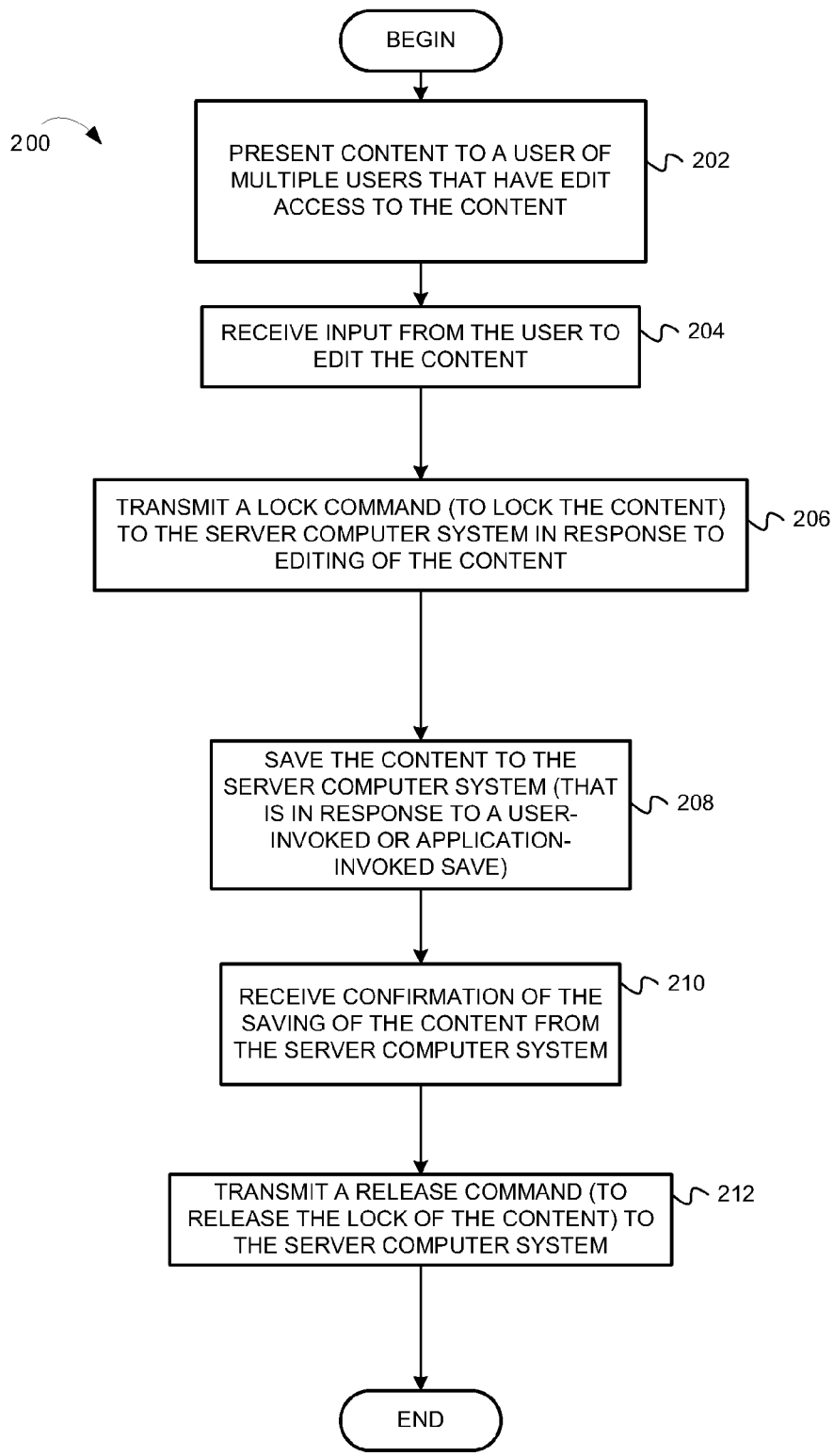
FIG. 2 is a diagram of a method for editing of electronic content in a collaborative environment, according to some example embodiments.
Figure 5:
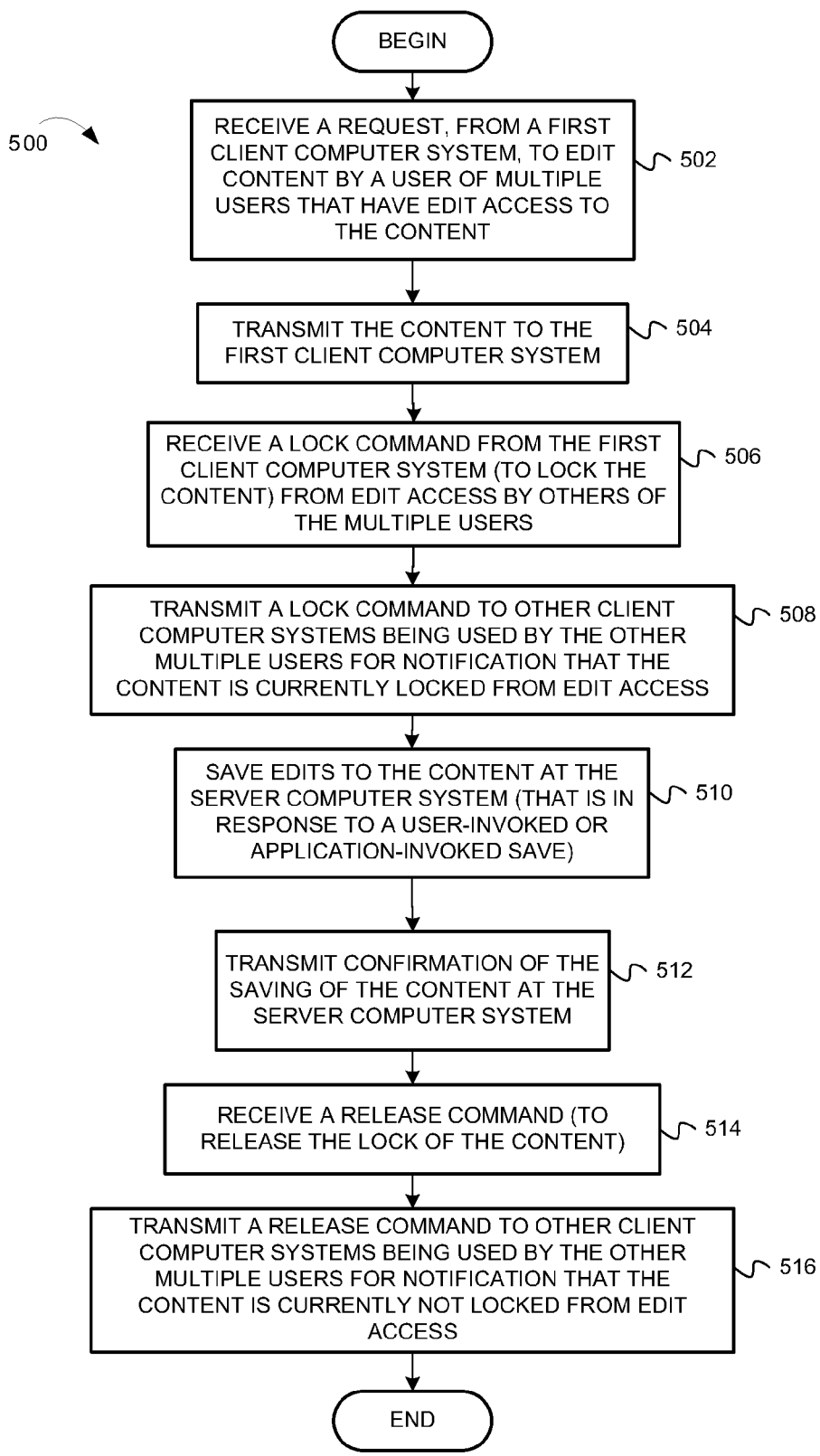
FIG. 5 is a diagram of a method for controlling editing of electronic content by a content server in a collaborative environment, according to some example embodiments.
Figure 7:
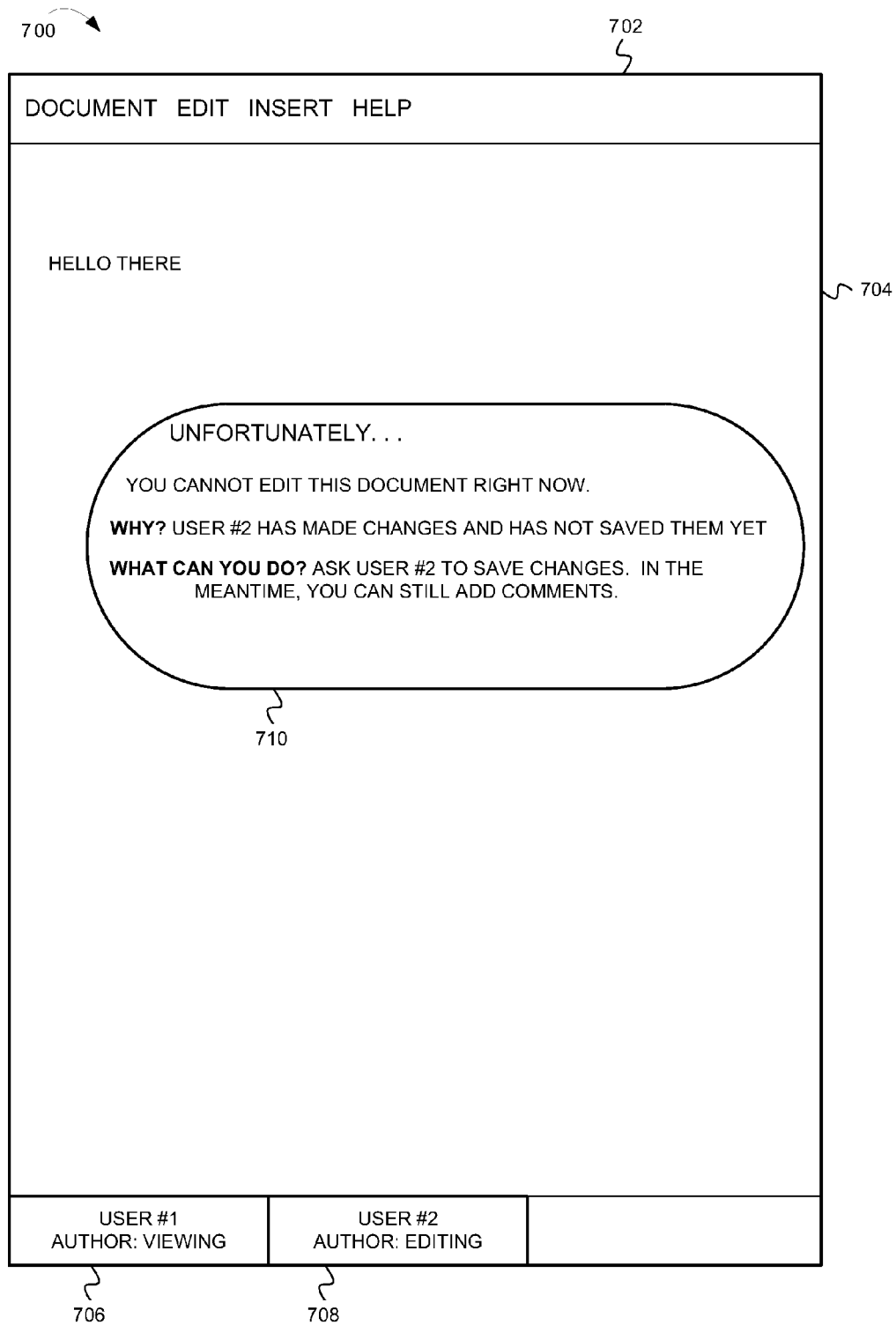
FIG. 7 shows a screenshot of locked electronic content during an attempt to edit the content by one user out of multiple users having edit access, according to some example embodiments.

Operations, according to example embodiments, are now described. In certain embodiments, the operations are performed when instructions residing on machine-readable media (e.g., software) are executed, while in other embodiments, the methods are performed by hardware or other logic (e.g., digital logic). FIGS. 2, 5 and 7 are diagrams of methods for editing and controlling of editing in a collaborative environment, according to some example embodiments. In particular, FIG. 2 illustrates operations from the perspective of the application module 104 that is able to lock content in response to an edit, according to some example embodiments. FIG. 5 illustrates operations from the perspective of the control module 110, according to some example embodiments. FIG. 7 illustrates operations from the perspective of the application module 104 that is not able to lock the content in response to an edit, according to some example embodiments.

Accordingly, FIG. 2 is a diagram of a method for editing of electronic content in a collaborative environment, according to some example embodiments. A method 200 is described with reference to FIG. 1. In some example embodiments, the method 200 is performed by the application module 104. The method 200 commences at block 202.

Figure 3:
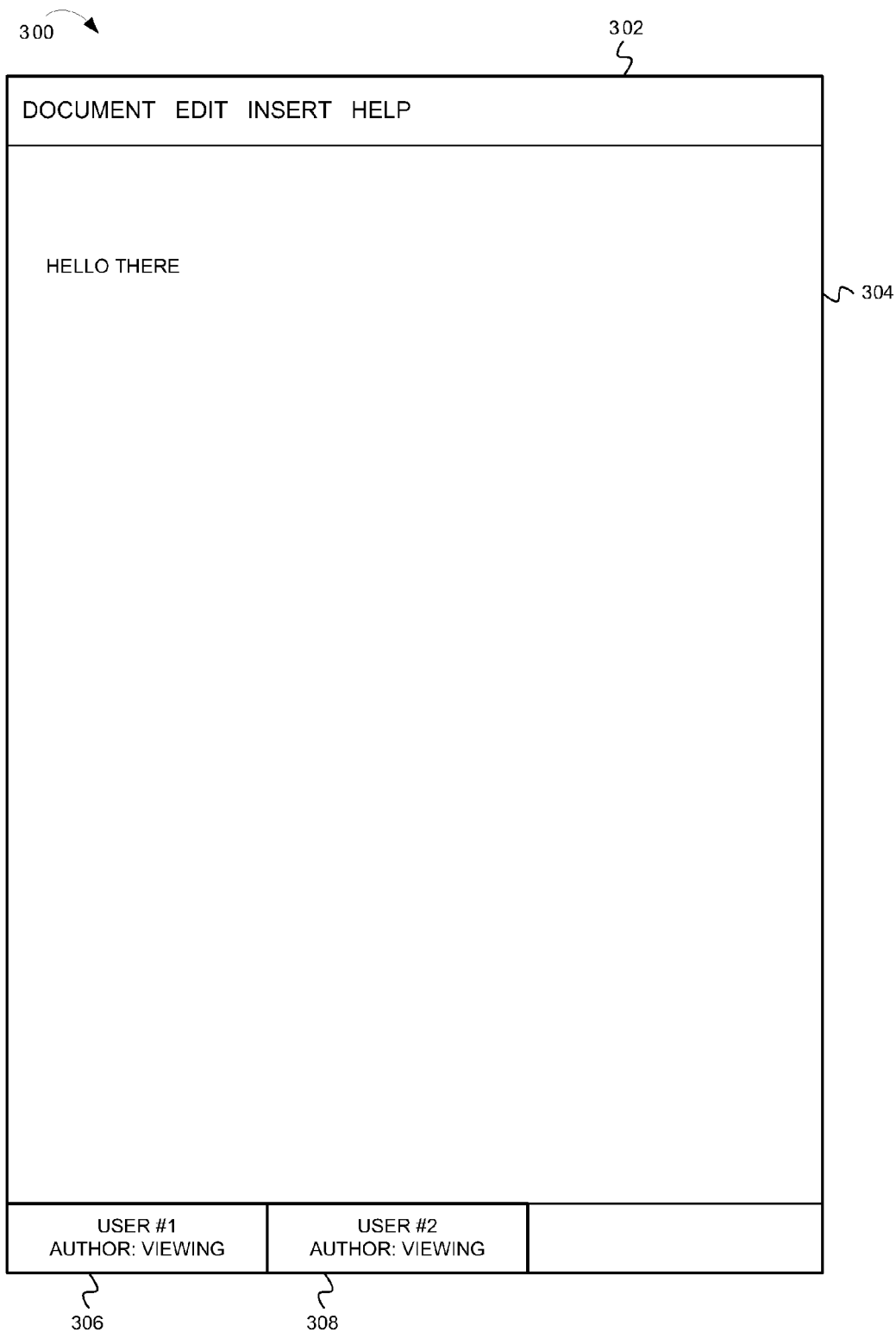
FIG. 3 shows a screenshot of content being edited by one user out of multiple users having edit access, according to some example embodiments.

At block 202, the application module 104 presents content 114 to one or more users out of multiple users that have edit access to the content. In some example embodiments, the application module 104 may present a specific type of content 114 (e.g., an electronic document) to the user after the user selects the content 114 for editing. The application module 104 may request and receive the content 114 from the control module 110 on the server computer system 108. The application module 104 may present the content 114 to the user using some type of display. FIG. 3 shows a screenshot of content being edited by one user out of multiple users having edit access, according to some example embodiments. A screenshot 300 illustrates a word processing application 302 wherein an electronic document 304 is being edited. At the bottom of the screenshot 300, a list of users is shown that have access to the electronic document 304. A user identification 306 and a user identification 308 include the identification of a user, their role and the status of their current access of the electronic document 304.

For example, the user identification 306 identifies a user #1 that has an author role (which enables user #1 to edit the electronic document 304). The user identification 306 also indicates that the current access status is "viewing" for user #1. Accordingly, user #1 is currently viewing but not editing the electronic document 304. The user identification 308 identifies a user #2 that has an author role (which enables user #2 to edit the electronic document 304). The user identification 308 also indicates that the current access status is "viewing" for user #2. Returning to FIGS. 1 and 2, it can be seen that the method 200 may continue at block 204.

Figure 4:
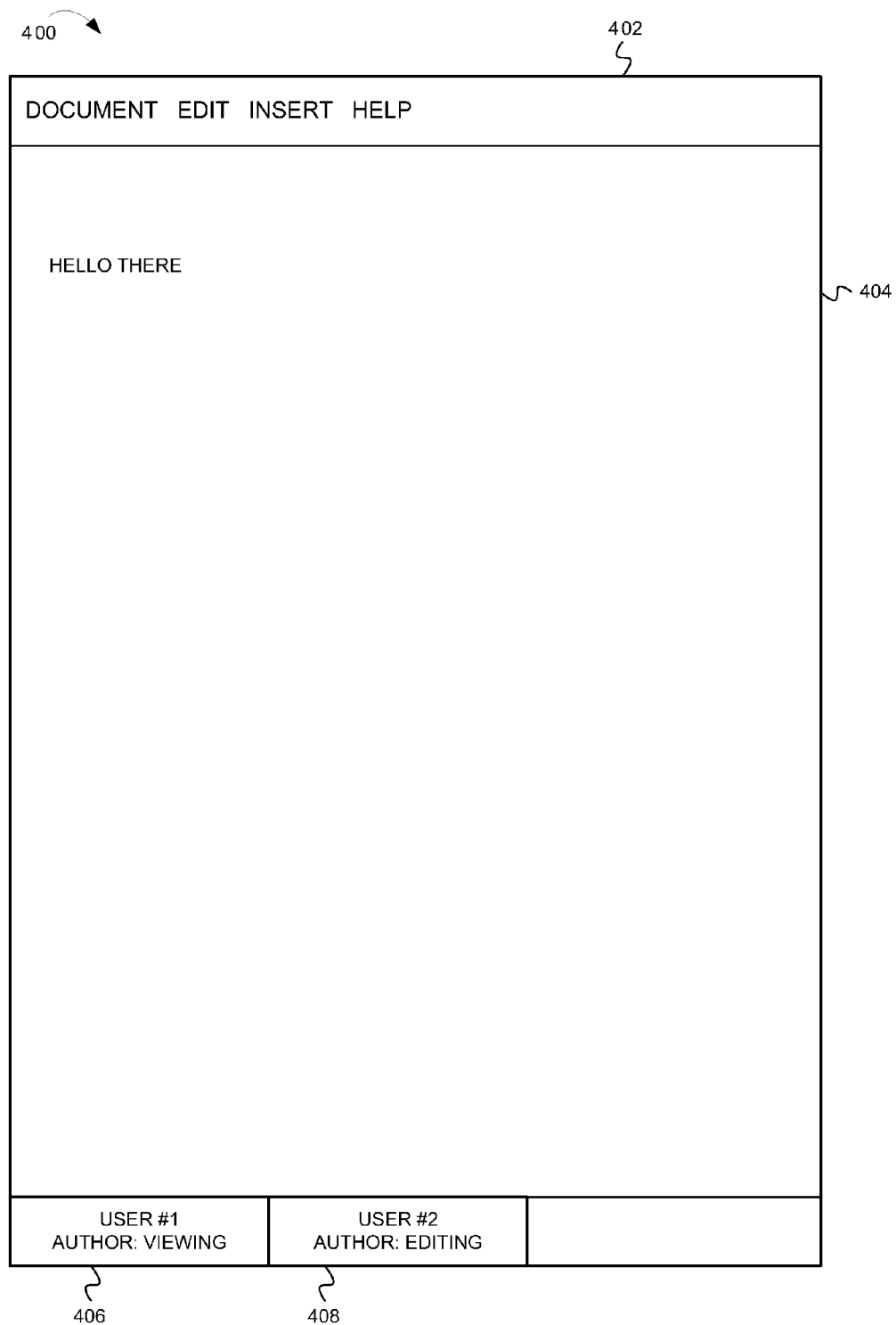
FIG. 4 shows another screenshot of content being edited by one user out of multiple users having edit access, according to some example embodiments.

At block 204, the application module 104 receives input from the user indicating a desire to edit the content 114. The input may be from a keyboard, mouse, microphone, etc. that causes changes in the content 114. The application module 104 may update the local copy of the content 114 that is being stored in some type of machine-readable medium (not shown) on the client computer system 102. For example, the updates may be made to a copy of the content 114 stored in random access memory. The application module 104 may also update any display of the content 114. FIG. 4 shows another screenshot of content being edited by one user out of multiple users having edit access, according to some example embodiments. A screenshot 400 illustrates a word processing application 402 wherein an electronic document 404 is being edited. In particular, the screenshot 400 is similar to the screenshot 300 of FIG. 3. However, the screenshot 400 illustrates the access status view after one of the users has begun editing the electronic document 404. These same screenshots may be displayed at the different client devices where the users are accessing the electronic document. Accordingly, different users may know which users among those that have access privileges are accessing the electronic document, the role of those that have access, which (if any) of the users is editing the electronic document, etc. Thus, at the bottom of the screenshot 400, a list of users is shown that have access to the electronic document 404. A user identification 406 is similar to the user identification 306 of FIG. 3. A user identification 408 is similar to the user identification 308 of FIG. 3 (except that the current access status for user #2 has changed to "editing"). Accordingly, user #2 is editing the electronic document 404, thereby precluding user #1 from editing (as further described below). Thus, the user identification 408 includes notification to user #1 that user #2 has made edits to the electronic content that has not been saved in the machine-readable medium 112 in the server computer system 108.

Returning to the description of block 204 of FIG. 2, in some example embodiments, edits to the content 114 are not transmitted to the server computer system 108 until the content 114 is saved (as further described below). The method continues at block 206.

At block 206, the application module 104 transmits a lock command (to lock the content 114) to the server computer system 108, in response to editing of the content 114. As further described below, the lock command precludes other users from editing the same content 114. In some situations, two users may be attempting edits at approximately the same time. Accordingly, one user will be able to lock the content 114, while the second user is locked out. Thus, the second user has made edits to content 114 that has been locked from edit access.

In some example embodiments, the application module 104 for the second user may process these edits that occur at different times differently (depending on the amount time that has expired between when the edit occurred and when the attempted lock command is transmitted to the server computer system 108). For example, if the amount of time that has expired is less than a given time period (e.g., 10 seconds, 20 seconds, 30 seconds, 1 minute, etc.), the application module 104 can display an error message to the second user and the edits made by the second user are discarded. If the amount of time that has expired is greater than the given time period, the application module 104 provides an option to the second user to save the content 114 under a different name (thus creating separately saved content 114 within the server computer system 108).

This preclusion of editing (caused by the lock command) remains until the edits that have already been entered are saved at the server computer system 108. Accordingly, locking occurs in response to an edit action that remains unsaved. There is no requirement that the user perform an explicit check-out of the content 114 in order to ensure that other users are precluded from editing the content 114. The method 200 continues at block 208.

At block 208, the application module 104 saves the content 114 to the server computer system 108. In some example embodiments, the application module 104 saves the content 114 in the machine-readable medium 112 at the server computer system 108. The application module 104 may transmit unsaved edits to the server computer system 108 via any type of communication (as described above). In some example embodiments, the save activity may be in response to a user-invoked save action, or an application-invoked save action. In particular, saving the content 114 may be invoked by input from a user that is editing the content 114. Alternatively or in addition, the application module 104 may periodically perform a save (e.g., an auto-save). In some example embodiments, the application module 104 may save the content 114 (independent of user input) after a time period (that starts after an edit has occurred) during which there is no user activity relative to the content 114. For example, user activity may comprise editing data, movement of a cursor through the content 114, etc. In some example embodiments, this time period may be 15 seconds, 30 seconds, 45, seconds, 1 minute, 5 minutes, etc. Alternatively or in addition, the application module 104 may save the content 114 (independent of user input) after a time period (that starts after an edit has occurred) even if there is user activity relative to the content 114. In some example embodiments, this time period may be 30 seconds, 1 minute, 2 minutes, 3 minutes, 5 minutes, 10 minutes, etc. The method 200 continues at block 210.

At block 210, the application module 104 receives confirmation of the saving of the content 114 (at the server computer system 108) from the server computer system 108. In particular, if the edits to the content 114 are saved by the control module 110 in the machine-readable medium 112, the control module 110 transmits a confirmation back to the client computer system 102. The method 200 continues at block 212.

At block 212, the application module 104 transmits a release command (to release the lock of the content 114) to the server computer system 108. The release command is transmitted to the server computer system 108 to enable other users having edit access to edit this particular content 114. As further described below, the control module 110 transmits a release command to other client devices that are accessing this particular content 114. Accordingly, the application modules on these other client computer systems may then enable editing of the content 114 by other users. The method 200 is complete.

The operations, according to some example embodiments, of the control module 110 at the server computer system 108 are now described. In particular, FIG. 5 is a diagram of a method for controlling editing of electronic content 114 by a server in a collaborative environment, according to some example embodiments. A method 500 is described with reference to FIG. 1. In some example embodiments, the method 500 is performed by the control module 110 executing on the server computer system 108. The method 500 commences at block 502.

At block 502, the control module 110 receives a request, from a first client computer system 102, to edit content 114 by one user out of multiple users that have edit access to the content 114. The request may come from the application module 104 for the client computer system 102 that is being used to edit the content 114. In some example embodiments, the request may be a result of a user opening the content 114 using the application module 104. The method 500 continues at block 504.

At block 504, the control module 110 transmits the content 114 to the first client computer system 102. The control module 110 may retrieve a copy of the content 114 from the machine-readable medium 112 for transmission to the first client computer system 102. The method 500 continues at block 506.

At block 506, the control module 110 receives a lock command from the first client computer system 102 (to lock the content 114) from edit access by others of the multiple users. In some example embodiments, the lock command is received from the application module 104 in response to the first user editing the particular content 114 (as described above). The method 500 continues at block 508.

At block 508, the control module 110 transmits a lock command to other client computer systems 102 being used by other users. The lock command provides notification that the content 114 is currently locked from edit access. In some example embodiments, the control module 110 only transmits the lock command to the client computer systems 102 where the content 114 is currently being accessed. As further described below, the application modules 104 executing on these other client computer systems 102 prevent the users from editing the content 114 after the lock command is received. The method 500 continues at block 510.

At block 510, the control module 110 saves edits to the content 114 at the server computer system 108. In some example embodiments, a save command may be received from the client computer system 102 that is being used to edit the content 114. As described above, the save command may be in response to user-invoked or application-invoked save activity. The control module 110 may save the edits for this content 114 into the machine-readable medium 112. The method 500 continues at block 512.

At block 512, the control module 110 transmits confirmation of saving the content 114 at the server computer system 108. In particular, the control module 110 may transmit the confirmation back to the client computer system 102 from which the save command was received. The method 500 continues at block 514.

At block 514, the control module 110 receives a release command (to release the lock on the content 114). The release command may be received from the application module 104 that is executing on the client computer system 102 that saved the content 114. In some example embodiments, the release command enables other users to edit this particular content 114. The method 500 continues at block 516.

At block 516, the control module 110 transmits a release command to the other client computer systems 102 being used by other users having edit access with respect to the content 114. The release command provides notification that the content 114 (that was previously locked) can now be edited by the other users. In some example embodiments, the control module 110 only transmits to the client computer systems 102 wherein the content 114 is currently being accessed. As further described below, the application modules 104 executing on these other client computer systems 102 then allow the users to edit this particular content 114 after the release command is received.

In some example embodiments, the control module 110 may also transmit a release command to the other client computer systems 102 if there is a communication loss with the client computer system 102 that has locked the content 114. In particular, the control module 110 may exchange ping-type communications with the client computer system 102. If this communication ceases beyond a given period of time (e.g., 1 minute, 2 minutes, 5 minutes, 10 minutes, etc.), the control module 110 may release any locks currently in force. In some example embodiments, the client computer system that lost the lock may be able to reconnect and save unsaved edits. In particular, if the client computer system 102 reconnects with the server computer system 108 and no other client computer system 102 has locked the content 114 during the time when communication was lost, the application module 104 thereon may able to re-obtain the lock for the content 114. After the release command is transmitted, the method 500 is complete.

Figure 6:
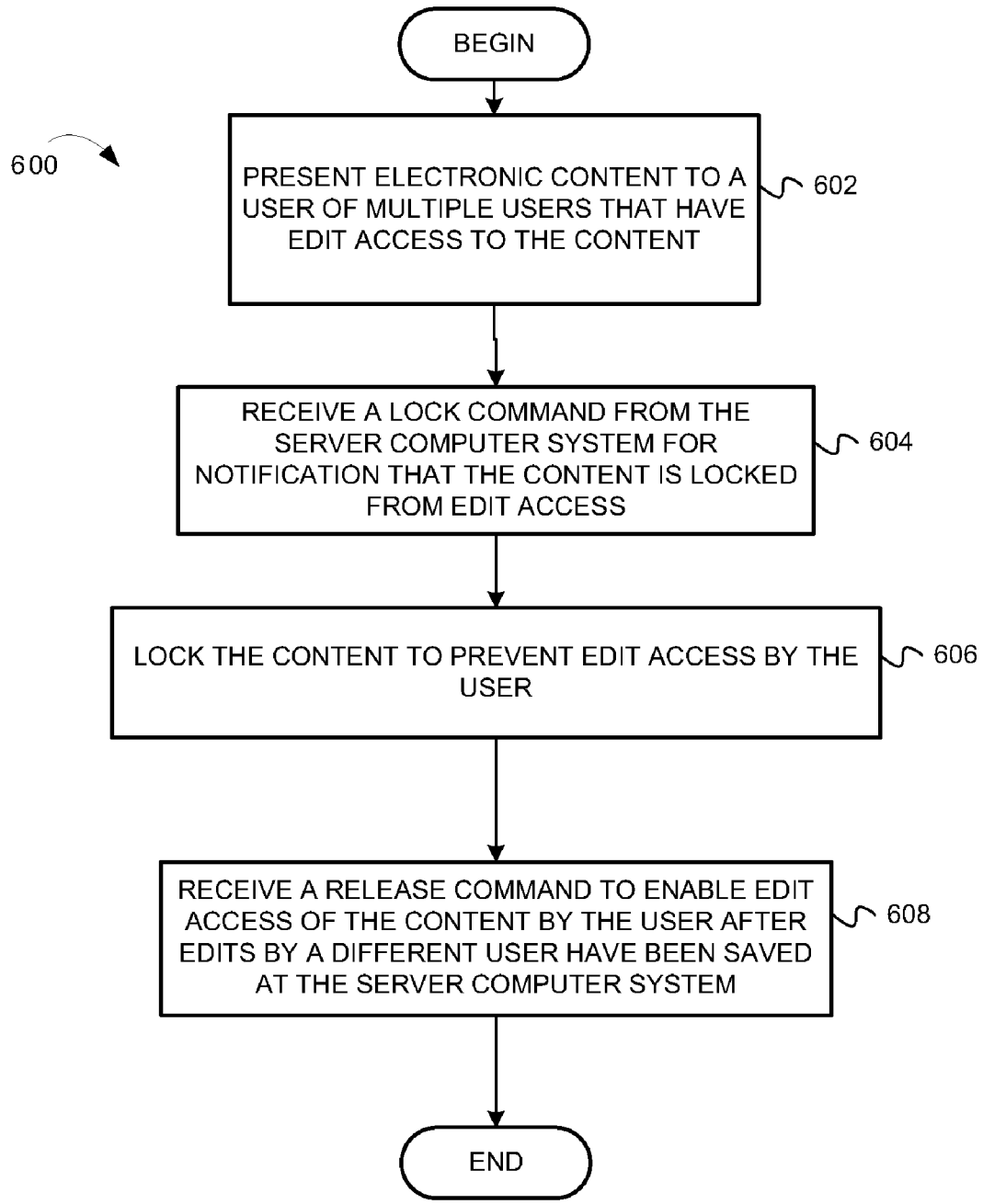
FIG. 6 is a diagram of a method for limiting edit access of electronic content by one user because another user currently has made unsaved edits to the electronic content, according to some example embodiments.

Additional operations, according to some example embodiments, of the application module 104 at the client computer system 102 are now described. In particular, these operations are from the perspective of the application module 104 that is being used by one user that is locked from edit access because another user is editing the content 114. Thus, FIG. 6 is a diagram of a method for limiting edit access of content by one user because another user currently has made unsaved edits to the content 114, according to some example embodiments. A method 600 is described with reference to FIG. 1. In some example embodiments, the method 600 is performed by the application module 104. The method 600 commences at block 602.

At block 602, the application module 104 presents content 114 to one or more users that have edit access to the content 114. In some example embodiments, the application module 104 may present particular content 114 (e.g., an electronic document) to a user after the user selects the content 114 for editing. The application module 104 may request and receive the content 114 from the control module 110 on the server computer system 108. The application module 104 may present the content 114 to the user using some type of display (see. FIG. 3 describe above). The method 600 continues at block 604.

At block 604, the application module 104 receives a lock command from the server computer system 108. The lock command provides notification that the content 114 is currently locked from edit access because a different user has made edits to the content 114 that are not saved. The method 600 continues at block 606.

At block 606, the application module 104 locks the content 114 to prevent edit access by one or more users. Accordingly, these users are not allowed to edit the content 114 until the lock is released by saving the edits at the server computer system 108 (as described above).

In some example embodiments, a pop-up message is displayed to the user regarding their inability to edit. To illustrate, FIG. 7 shows a screenshot of locked content 114 during an attempt to edit the content 114 by one user out of multiple users having edit access, according to some example embodiments. Similar to the screenshots 300 and 400 of FIGS. 3 and 4, respectively, the screenshot 700 illustrates a word processing application 702 wherein an electronic document 704 is being edited. The screenshot 700 illustrates the view after one of the users attempts to edit the electronic document 704 that is currently locked because of unsaved edits entered by a different user. An error message 710 is displayed in response to the attempt to edit. The error message 710 provides notification and informs the user that they may add comments regarding the electronic document. However, the user is not allowed to edit the electronic document 704. At the bottom of the screenshot 700, a list of users is shown that have access to the electronic document 704. The user identification 706 is similar to the user identification 406 of FIG. 4. The user identification 708 is similar to the user identification 408 of FIG. 7. In some example embodiments, the error message 710 may also notify the user that comments may be added to the electronic content (even though editing cannot occur). In some example embodiments, comments comprise any type of data that is added to the electronic content but does not edit the electronic content. Such data is generally displayed along side the electronic content. For example, a reviewer of the electronic content may provide commentary regarding the electronic content. Such comments may be shown in a comment window on a side of the electronic content. Adding comments to the electronic content is further described in U.S. patent application Ser. No. 12/119,249, filed on May 12, 2008 and titled "Document Comment Management" to Robert Shaver; the disclosure of which is incorporated by reference herein in its entirety. Accordingly, the user may input comments that are added to the electronic content (even though the user may not edit the electronic content. Returning to the method 600 of FIG. 6, the method 600 continues at block 608.

At block 608, the application module 104 receives a release command to enable edit access of the content 114 by another user. This release command may be received from the control module 110 at the server computer system 108. In some example embodiments, this release is a result of the unsaved edits made by a different user on a different client computer system 102 being saved at the server computer system 108 (as described above). Also, as a result, the application module 104 releases the lock that is precluding edit access of the content 114. In some example embodiments, an attempt to edit the electronic content by the user may cause or attempt to cause a release of the lock that is precluding edit access of the electronic content (that has been locked by the other user). To illustrate, assume that the electronic content is currently locked because the other user has made unsaved edits to the electronic content. If this user attempts to edit the electronic content, a communication may be transmitted to the server computer system 108, the server computer system 108 may determine if a time period has expired since there has been activity by the other user within the electronic document. For example, the server computer system 108 may query the client computer system 102 being used by the other user (that has caused the locking). The query may request the last time that the other user performed any activity in the electronic content (e.g., editing, movement of cursor, etc.). If a time period has expired, the server computer system 108 may release the lock. In some example embodiments, the server computer system 108 may save any unsaved edits to the electronic content prior to the release. Moreover, the server computer system 108 may notify the other user of the release. At this point, the method 600 may be complete.

While the communications regarding the locking and releasing of edit access to content 114 may be routed through a server computer system 108, in some example embodiments, some or all such communications may also be routed among the client computer systems (independent of the server computer system 108). For example, a lock command initiated due to the existence of unsaved edits at one client computer system may be transmitted to other applicable client computer systems. Alternatively or in addition, while the content 114 is described as being stored at the server computer system 108, in some example embodiments, the content 114 may be stored at the client computer systems in a peer-to-peer configuration. Accordingly, after an edit is saved, the saved content 114 is distributed to the different client computer systems. In some example embodiments, this storage of data in the client computer systems may be in addition to or independent of storage of such content 114 at the server computer system 108.

Figure 8:
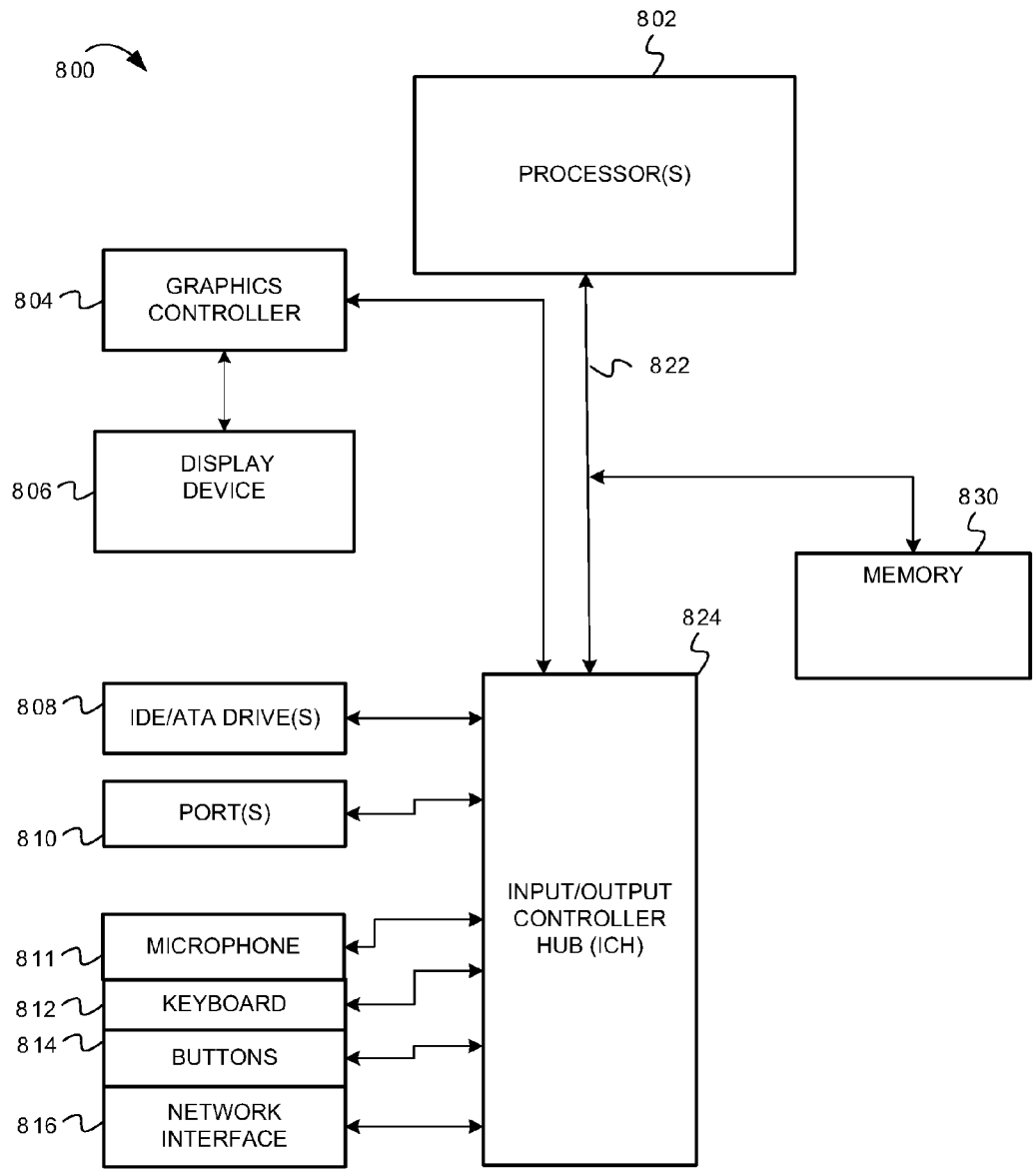
FIG. 8 illustrates a computer that may be used for editing content and controlling content editing in a collaborative environment, according to some example embodiments.

A detailed block diagram of an example computer environment, according to some embodiments, is now described. In particular, FIG. 8 illustrates a computer that may be used for content editing and controlling content editing in a collaborative environment, according to some example embodiments. A computer system 800 may be similar to or identical to one of the client computer systems 102, the server computer system 108, etc.

As illustrated in FIG. 8, the computer system 800 comprises processor(s) 802. The computer system 800 also includes a memory unit 830, processor bus 822, and Input/Output controller hub (ICH) 824. The processor(s) 802, memory unit 830, and ICH 824 are coupled to the processor bus 822. The processor(s) 802 may comprise any suitable processor architecture. The computer system 800 may comprise one, two, three, or more processors, any of which may execute a set of instructions to implement the various method embodiments of the invention.

The memory unit 830 may store data and/or instructions, and may comprise any suitable memory, such as a dynamic random access memory (DRAM). The computer system 800 also includes IDE drive(s) 808 and/or other suitable storage devices. A graphics controller 804 controls the display of information on a display device 806, according to some embodiments of the invention.

The input/output controller hub (ICH) 824 provides an interface to I/O devices or peripheral components for the computer system 800. The ICH 824 may comprise any suitable interface controller to provide for any suitable communication link to the processor(s) 802, memory unit 830 and/or to any suitable device or component in communication with the ICH 824. For one embodiment of the invention, the ICH 824 provides suitable arbitration and buffering for each interface.

For some embodiments of the invention, the ICH 824 provides an interface to one or more suitable integrated drive electronics (IDE) drives 808, such as a hard disk drive (HDD) or compact disc read only memory (CD ROM) drive, or to suitable universal serial bus (USB) devices through one or more USB ports 810. For one embodiment, the ICH 824 also provides an interface to a keyboard 812, a mouse 814, a CD-ROM drive 818, one or more suitable devices through one or more FireWire® ports 816. For one embodiment of the invention, the ICH 824 also provides a network interface 820 though which the computer system 800 can communicate with other computers and/or devices.

In some embodiments, the computer system 800 includes a machine-readable medium that stores a set of instructions (e.g., software) embodying any one, or all, of the methodologies for described herein. Furthermore, software may reside, completely or at least partially, within memory unit 830 and/or within the processor(s) 802.

In the description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that embodiments of the invention may be practiced without such specific details. In other instances, control structures, gate level circuits and full software instruction sequences have not been shown in detail in order not to obscure the embodiments of the invention. Those of ordinary skill in the art, with the included descriptions will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention include features, methods or processes that may be embodied within machine-executable instructions provided by a machine-readable medium. A machine-readable medium includes any mechanism which provides (i.e., stores and/or transmits) information in a form accessible by a machine (e.g., a computer, a network device, a personal digital assistant, manufacturing tool, any device with a set of one or more processors, etc.). In example embodiments, a machine-readable medium includes volatile and/or non-volatile media (e.g., read only memory (ROM), random access memory (RAM), magnetic disk storage media, optical storage media, flash memory devices, etc.).

Such instructions are utilized to cause a general or special purpose processor, programmed with the instructions, to perform methods or processes of the embodiments of the invention. Alternatively, the features or operations of embodiments of the invention are performed by specific hardware components which contain hard-wired logic for performing the operations, or by any combination of programmed data processing components and specific hardware components.

Embodiments of the invention include software, data processing hardware, data processing system-implemented methods, and various processing operations, further described herein.

In view of the wide variety of permutations to the embodiments described herein, this detailed description is intended to be illustrative only, and should not be taken as limiting the scope of the invention. What is claimed as the invention, therefore, is all such modifications as may come within the scope and spirit of the following claims and equivalents thereto. Therefore, the specification and drawings are to be regarded in an illustrative rather than a restrictive sense.

What is claimed is:

1. A method comprising:
   providing an electronic document for presentation to a user of multiple users that have edit access to the electronic document as part of a collaborative editing of the electronic document;
   receiving an input from the user to edit the electronic document at a device of the user, the input triggering a lock command to be generated at the device of the user; and
   transmitting the lock command from the device of the user in response to the receiving the input to edit the electronic document at the device of the user, the lock command causing invoking of a lock to prevent edit access by other users of the multiple users of the electronic document in response to the lock command.

2. The method of claim 1, wherein the invoking comprises transmitting the lock command to a server, the server to transmit a further lock command to prevent edit access to devices of the other users.

3. The method of claim 1 further comprising:
   saving content to a server;
   receiving a confirmation of the saving of the content from the server; and
   transmitting a release command to the server in response to receiving the confirmation, the server to transmit a further release command to devices of the other users.

4. The method of claim 1, wherein the invoking comprises:
   receiving the lock command from the device of the user; and
   transmitting a further lock command to prevent edit access to devices of the other users based on the receiving.

5. The method of claim 1, further comprising:
   performing a save at a server;
   sending a save confirmation to the device of the user based on saving an edit provided by the user; and
   receiving a release command from the device of the user in response to receiving the save confirmation.

6. The method of claim 1 further comprising transmitting a release command to devices of the other users.

7. The method of claim 1, further comprising allowing the other users to add a comment to the electronic document despite the lock to prevent edit access by the other users.

8. The method of claim 1, further comprising releasing the lock in response to a different user attempting to edit the electronic document and a time period having expired since there has been activity by the user to the electronic document.

9. The method of claim 1, further comprising providing a graphical user interface, the graphic user interface providing a list of the other users and an access status for each of the other users currently accessing the electronic document.

10. A non-transitory machine-readable medium including instructions, which when executed by a machine, cause the machine to perform operations comprising:
    providing an electronic document for presentation to a user of multiple users that have edit access to the electronic document as part of a collaborative editing of the electronic document;
    receiving an input from the user to edit the electronic document at a device of the user, the input triggering a lock command to be generated at the device of the user; and
    transmitting the lock command from the device of the user in response to the receiving of the input to edit the electronic document at the device of the user, the lock command causing invoking of a lock to prevent edit access by other users of the multiple users of the electronic document in response to the lock command.

11. The non-transitory machine-readable medium of claim 10, wherein the invoking comprises transmitting the lock command to a server, the server to transmit a further lock command to prevent edit access to devices of the other users.

12. The non-transitory machine-readable medium of claim 10, wherein the operations further comprise:
    saving content to a server;
    receiving a confirmation of the saving of the content from the server; and
    transmitting a release command to the server in response to receiving the confirmation, the server to transmit a further release command to devices of the other users.

13. The non-transitory machine-readable medium of claim 10, wherein the invoking comprises:
    receiving the lock command from the device of the user; and
    transmitting a further lock command to prevent edit access to devices of the other users based on the receiving.

14. The non-transitory machine-readable medium of claim 10, wherein the operations further comprise:
    performing a save at a server;
    sending a save confirmation to the device of the user based on saving an edit provided by the user; and
    receiving a release command from the device of the user in response to receiving the save confirmation.

15. The non-transitory machine-readable medium of claim 10, wherein the operations further comprise transmitting a release command to devices of the other users.

16. The non-transitory machine-readable medium of claim 10, wherein the operations further comprise allowing the other users to add a comment to the electronic document despite the lock to prevent edit access by the other users.

17. The non-transitory machine-readable medium of claim 10, wherein the operations further comprise releasing the lock in response to a different user attempting to edit the electronic document and a time period having expired since there has been activity by the user to the electronic document.

18. The non-transitory machine-readable medium of claim 10, wherein the operations further comprise providing a graphical user interface, the graphic user interface providing a list of the other users and an access status for each of the other users currently accessing the electronic document.

19. A server comprising:
    a non-transitory machine-readable medium to store an electronic document that is edit accessible by multiple users from client devices communicatively coupled to the server; and
    a control module to provide the electronic document for presentation to a user of multiple users that have edit access to the electronic document as part of a collaborative editing of the electronic document, to receive a lock command generated by a device of the user that is editing the electronic document, and to lock the electronic document to prevent edit access by other users of the multiple users of the electronic document in response to the lock command.

20. The server of claim 19, wherein the control module is further to release the lock of the electronic document to enable edit access by a different user of the multiple users in response to the different user attempting to edit the electronic document and a time period having expired since an activity by the user in the electronic document.

21. The server of claim 19, wherein the control module is further to release the lock of the electronic document to enable edit access by the other users after the electronic document has been saved on the non-volatile machine-readable medium in the server.

* * * * *

UNITED STATES PATENT AND TRADEMARK OFFICE
CERTIFICATE OF CORRECTION

PATENT NO. : 8,290,902 B1
APPLICATION NO. : 13/081236
DATED : October 16, 2012
INVENTOR(S) : Shaver et al.

It is certified that error appears in the above-identified patent and that said Letters Patent is hereby corrected as shown below:

On the Title page, Item (56) in column 2, under "Other Publications", Line 1, delete "al" and insert --al.,--, therefor On Title page 2, Item (56) in column 2, under "Other Publications", Line 1, delete "al" and insert --al.,--, therefor On Title page 2, Item (56) in column 2, under "Other Publications", Line 36, delete "3." and insert --3 pgs.--, therefor On Title page 3, Item (56) in column 1, under "Other Publications", Line 13, after "com/" insert -->--, therefor On Title page 3, Item (56) in column 1, under "Other Publications", Line 34, delete "interent" and insert --internet--, therefor On Title page 3, Item (56) in column 1, under "Other Publications", Line 36, delete "E," and insert --E.,--, therefor On Title page 3, Item (56) in column 2, under "Other Publications", Line 17, before "U.S.", insert --"--, therefor On Title page 3, Item (56) in column 2, under "Other Publications", Line 18, after "2010,", insert --"--, therefor On Title page 3, Item (56) in column 2, under "Other Publications", Line 19, before "U.S.", insert --"--, therefor On Title page 3, Item (56) in column 2, under "Other Publications", Line 19, after "2011,", insert --"--, therefor Signed and Sealed this
Twenty-sixth Day of March, 2013

Teresa Stanek Rea
*Acting Director of the United States Patent and Trademark Office*

On Title page 3, Item (56) in column 2, under "Other Publications", Line 21, before "U.S.", insert --"--, therefor On Title page 3, Item (56) in column 2, under "Other Publications", Line 21, after "2010,", insert --"--, therefor On Title page 3, Item (56) in column 2, under "Other Publications", Line 22, before "U.S.", insert --"--, therefor On Title page 3, Item (56) in column 2, under "Other Publications", Line 23, after "2010,", insert --"--, therefor On Title page 3, Item (56) in column 2, under "Other Publications", Line 24, before "U.S.", insert --"--, therefor On Title page 3, Item (56) in column 2, under "Other Publications", Line 25, after "2010,", insert --"--, therefor On Title page 3, Item (56) in column 2, under "Other Publications", Line 26, before "U.S.", insert --"--, therefor On Title page 3, Item (56) in column 2, under "Other Publications", Line 26, after "2011,", insert --"--, therefor On Title page 3, Item (56) in column 2, under "Other Publications", Line 28, before "U.S.", insert --"--, therefor On Title page 3, Item (56) in column 2, under "Other Publications", Line 28, after "2011,", insert --"--, therefor On Title page 3, Item (56) in column 2, under "Other Publications", Line 30, before "U.S.", insert --"--, therefor On Title page 3, Item (56) in column 2, under "Other Publications", Line 31, after "2011,", insert --"--, therefor On Title page 3, Item (56) in column 2, under "Other Publications", Line 32, before "U.S.", insert --"--, therefor On Title page 3, Item (56) in column 2, under "Other Publications", Line 32, after "2012,", insert --"--, therefor On Title page 3, Item (56) in column 2, under "Other Publications", Line 34, before "U.S.", insert --"--, therefor

CERTIFICATE OF CORRECTION (continued)
U.S. Pat. No. 8,290,902 B1

On Title page 3, Item (56) in column 2, under "Other Publications", Line 35, after "2011,", insert --"--, therefor On Title page 3, Item (56) in column 2, under "Other Publications", Line 36, before "U.S.", insert --"--, therefor On Title page 3, Item (56) in column 2, under "Other Publications", Line 37, after "2011,", insert --"--, therefor On Title page 3, Item (56) in column 2, under "Other Publications", Line 38, before "U.S.", insert --"--, therefor On Title page 3, Item (56) in column 2, under "Other Publications", Line 38, delete "12/119,421." and insert --12/119,421,--, therefor On Title page 3, Item (56) in column 2, under "Other Publications", Line 39, after "2012,", insert --"--, therefor On Title page 3, Item (56) in column 2, under "Other Publications", Line 40, before "U.S.", insert --"--, therefor On Title page 3, Item (56) in column 2, under "Other Publications", Line 40, after "2012,", insert --"--, therefor In column 11, line 25, in claim 1, after "receiving", insert --of--, therefor